Dec. 11, 1951     J. C. H. MAHEUX     2,578,011
SHAFT MEASURING TOOL
Filed Feb. 10, 1951
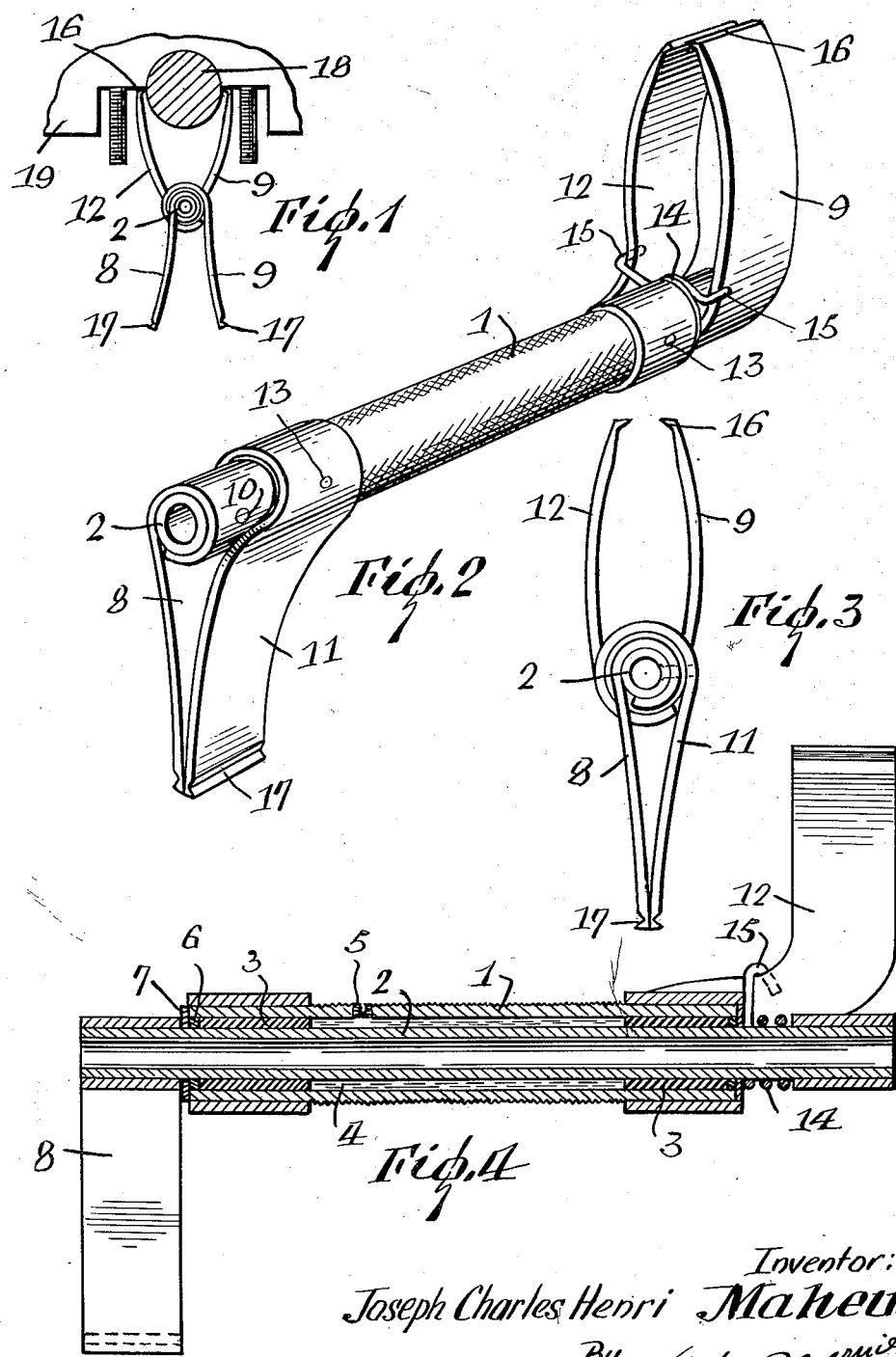
Inventor:
Joseph Charles Henri Maheux
By Albert Fournier
Attorney

UNITED STATES PATENT OFFICE 2,578,011

SHAFT MEASURING TOOL

Joseph Charles Henri Maheux, Quebec, Quebec, Canada

Application February 10, 1951, Serial No. 210,339

6 Claims. (Cl. 33—149)

The present invention pertains to a tool for measuring shaft diameters for wear.

The principal object of the invention is to provide such a tool for reaching inaccessible shafts such as the crank shafts of motor vehicles. Ordinarily such shafts can be measured only when removed from the engine block. The device of this invention requires no such removal.

Another object of the invention is to provide a relatively simple and inexpensive device for the purpose described.

In the accomplishment of these objects, the device comprises a pair of concentric tubes, one of which is rotatable within the other. At each end of each tube is secured a radially extending finger, and the fingers are paired at each end of the device. One pair is applied to mounted shaft, and the spreading thereof is transmitted through the rotatable tubes to the other pair.

All four fingers are of equal radial extent, so that the spacing thereof at both ends is equal. Thus, the spacing of the fingers engaging the shaft is measured accurately at the other pair. The ends of the fingers are properly shaped for engaging the shaft and for being measured. One pair of fingers is drawn together by a spring, for firm engagement with the measured shaft.

The tubes are spaced by bushings at their ends, and the space between the bushings preferably contains an oil wick. The wick is loaded on removing a screw plug in the outer shaft.

The invention is fully disclosed by way of example in the following description and in the accompanying drawings in which—

Figure 1 is a cross section of a shaft with the measuring tool in end view;

Figure 2 is a perspective view of the device;

Figure 3 is an end view thereof; and

Figure 4 is a longitudinal section.

Reference to these views will now be made by use of like characters which are employed to designate corresponding parts throughout.

In Figure 4 the device is shown as including an outer tube 1 and an inner tube 2 held in spaced relation by a pair of bushings 3 at the ends. The intervening space contains an oil wick 4 which is loaded on removing a screw plug 5. The outer ends of the bushings are sealed by felt washers 6 and steel rings 7.

The inner tube 2 extends beyond the outer tube 1 at both ends. On the exposed ends are secured fingers 8 and 9 respectively, preferably by pins 10. The fingers preferably extend in mutually opposite directions.

On the ends of the outer tube 1 are secured fingers 11 and 12, by pins 13, bent laterally from the point of attachment to lie respectively opposite the fingers 8 and 9. A spring 14 is coiled around the tube 2 and has its ends hooked at 15 on the fingers 9 and 12. These fingers are thus brought into mutual engagement, as are the fingers 8 and 11.

One pair of fingers, for example the fingers 9 and 12, have their outer ends directed toward each other and formed with inwardly directed sharp edges 16. The fingers 8 and 11 are bowed inwardly and are formed with outwardly directed edges 17.

The edges 16 are thus adapted to engage a crankshaft 18 supported by bearings (not shown) in a motor block 19. As the fingers 9 and 12 are spread apart, the tubes 1 and 2 are rotated relatively and cause a similar spreading of the fingers 8 and 11 carried thereby. All four fingers are of equal radial extent at the outer edges, and the spacing of the edges 17 therefore equals the spacing of the edges 16. The spacing of the edges 17 is now measured by calipers or a micrometer to give the diameter of the crankshaft which is otherwise inaccessible for measurement.

Although a specific embodiment of the invention has been illustrated and described, it will be understood that various alterations in the details of construction may be made without departing from the scope of the invention as indicated by the appended claims.

What I claim is:

1. A measuring tool comprising a pair of tubes mounted rotatably one within the other, a finger secured to each end of each tube, the fingers at each end lying adjacent to each other and shaped for mutual contact at their free ends, all of said fingers being of equal radial extent, whereby the displacement of one pair of free ends results in equal displacement of the other pair of free ends.

2. A measuring tool comprising a pair of tubes mounted rotatably one within the other, a finger secured to each end of each tube, the fingers at each end lying adjacent to each other and shaped for mutual contact at their free ends, all of said fingers being of equal radial extent, whereby the displacement of one pair of free ends results in equal displacement of the other pair of free ends, and a spring normally drawing the fingers at one end together.

3. A measuring tool comprising a pair of tubes mounted rotatably one within the other, bushings in the ends of the outer tube to hold said tubes spaced and concentric, a plug in the outer tube and between said bushings for access to the space between the bushings, a finger secured to each end of each tube, the fingers at each end lying adjacent to each other and shaped for mutual contact at their free ends, all of said fingers being of equal radial extent, whereby the displacement of one pair of free ends results in equal displacement of the other pair of free ends.

4. A measuring tool comprising a pair of tubes mounted rotatably one within the other, the ends of the inner tube extending beyond the ends of the outer tube, a finger secured to each end of each tube, the fingers at each end lying adjacent to each other and shaped for mutual contact at their free ends, all of said fingers being of equal radial extent, whereby the displacement of one pair of free ends results in equal displacement of the other pair of free ends.

5. A measuring tool comprising a pair of tubes mounted rotatably one within the other, a finger secured to each end of each tube, the fingers at each end lying adjacent to each other and shaped for mutual contact at their free ends, all of said fingers being of equal radial extent, whereby the displacement of one pair of free ends results in equal displacement of the other pair of free ends, one pair of fingers having inwardly directed free ends and the other pair having outwardly directed free ends.

6. A measuring tool comprising a pair of tubes mounted rotatably one within the other, a finger secured to each end of each tube, the fingers at each end lying adjacent to each other and shaped for mutual contact at their free ends, all of said fingers being of equal radial extent, whereby the displacement of one pair of free ends results in equal displacement of the other pair of free ends, one pair of fingers having inwardly directed free ends and the other pair having outwardly directed free ends, and a spring normally drawing the fingers at one end together.

JOSEPH CHARLES HENRI MAHEUX.

No references cited.